March 5, 1957 E. W. DRYER 2,783,661
TWO SPEED REAR AXLE
Filed May 15, 1952

Inventor
Ervin W. Dryer
By Willits, Helwig & Baillio
Attorneys

United States Patent Office 2,783,661
Patented Mar. 5, 1957

2,783,661

TWO SPEED REAR AXLE

Ervin W. Dryer, Lake Orion, Mich., assignor to General Motors Corporation, Detroit, Mich., a corporation of Delaware Application May 15, 1952, Serial No. 287,975

7 Claims. (Cl. 74—781)

My invention relates to improvements in a power transmission mechanism. More particularly my invention relates to an improved two speed rear axle.

In order to have a wide range of power transmission ratios available on vehicles operating under conditions of greatly varying torque requirements, it is particularly advantageous to employ multi-speed differentials.

For the sake of illustration, I have embodied my invention in a two speed rear axle. Having such an axle on a vehicle, in effect, doubles the number of speed reduction or torque multiplication ratios available to the operator. While two speed rear axles are mainly in demand on heavy duty vehicles, such as trucks or busses, they are equally applicable to passenger cars.

My improvements relate specifically to a multi-speed differential utilizing a double or compound planetary gear arrangement, which consists of two planetary gearsets in series, and in which at least one of the planetary gearsets is manually controllable.

In relation to the manually controllable planetary gearset, operator controlled means is available for locking together two members of the gearset providing direct or high speed drive therethrough and also for locking a single member against rotation to provide reduced or low speed drive.

It is a general object of my invention to provide an improved means for transferring the reaction torque from a locked planetary gear member to the differential housing or carrier.

It is more particularly an object of my invention to provide a torque transferring member which is removably mounted externally upon the differential carrier.

It is also an object of my invention to provide a reaction plate which coacts with lateral projections of the differential carrier to transfer planetary gear reaction torque to said carrier.

It is a further object of my invention to provide a reaction plate member mounted upon the differential carrier having engaging means for locking a planetary gear member against rotation.

It is another general object of my invention to provide in combination with a planetary gearset mounted in a bearing mechanism, a bearing adjusting member; the aforementioned torque reaction plate member; and means, also associated with said reaction plate member, for locking said bearing adjusting member against movement.

It is thus a further object of my invention to provide a member mounted upon the differential carrier which includes a first locking means for restraining movement of a bearing adjusting element and a second locking means for grounding a planetary gear member to the differential carrier.

It is a still further object of my invention to provide a plate member having a collar adapted to project within the differential casing and which collar has gear teeth formed internally and externally thereof to respectively lock a planetary gear element against rotation and to lock a bearing adjusting member against movement.

Further objects and details will be apparent from a perusal of the ensuing detailed description of my invention.

Figure 1:
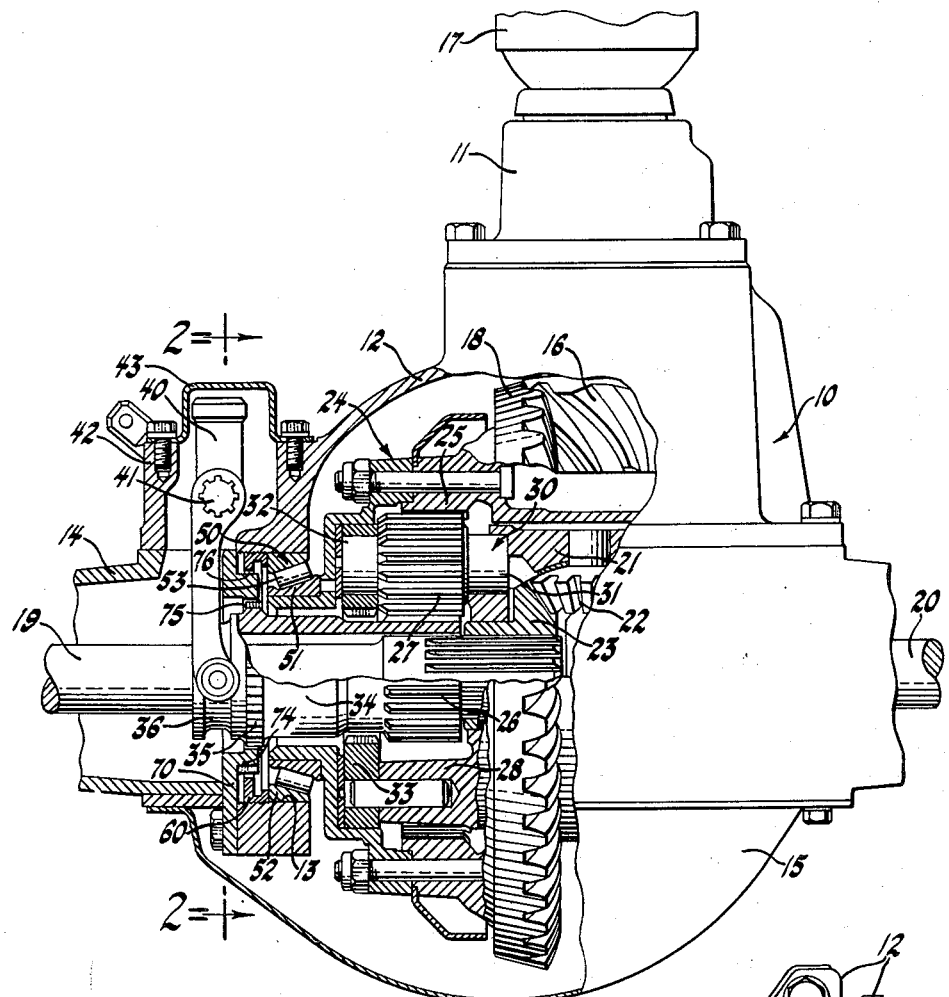
Figure 1 is a broken away and partially sectioned view of a two speed rear axle embodying my invention.
Figure 2:
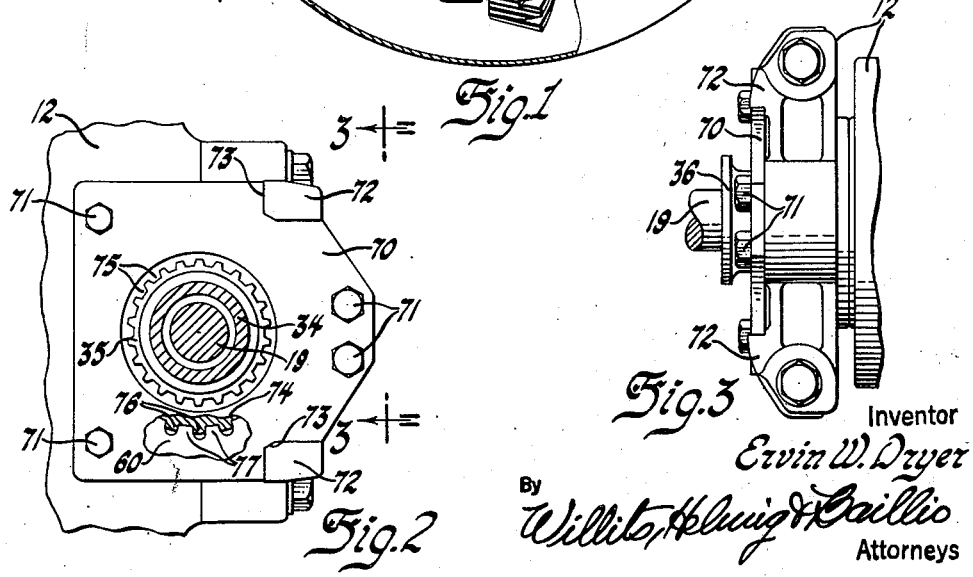
Figure 2 is a sectional view along line 2—2 of Figure 1 showing in detail the construction of my torque reaction and bearing locking plate.
Figure 3:
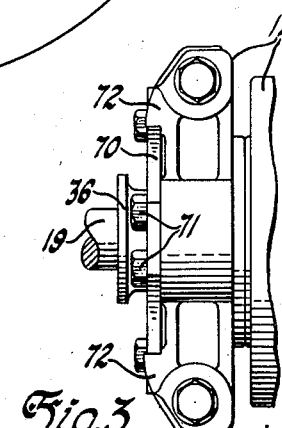
Figure 3 is a partial bottom view of the two speed rear axle showing particularly the cooperation of the reaction plate and the lugs extending laterally from the differential carrier.

A brief description of the structure and operation of a two speed differential mechanism indicated generally at 10 in which my improvement may be embodied will be undertaken in order to provide a better appreciation of how my invention contributes to a more satisfactory multi-speed rear axle.

The differential includes a pinion casing 11, a differential housing 12 including openings 13, an axle housing 14 and a housing cover 15. A pinion gear 16 fixed on a propeller shaft 17 drives a ring gear 18 which in turn drives through a double planetary-differential gear arrangement from whence power is delivered to driving axles 19 and 20. The double planetary-differential gear arrangement includes a differential pinion carrier 21, a plurality of differential pinion gears 22 rotatably mounted upon carrier 21 and a pair of drive gears 23 respectively secured to axles 19 and 20.

In a normal single speed differential mechanism drive to the rear wheels would be from pinion gear 16 to ring gear 18, to differential pinion carrier 21, gears 22 and to drive gears 23 on the driving axles. In such an arrangement, however, the differential reduction ratio would remain constant.

In order to obtain a differential having two speed or reduction ratios, however, a manually controlled planetary gearset indicated generally at 24 is inserted in series in the power train between ring gear 18 and differential pinion carrier 21. Therefore, depending on the condition of the planetary gear set, i. e. direct or gear drive, the torque delivered to the axles will be relatively low or high in accordance with the demand of the operator.

Planetary gearset 24 consists of an annulus gear 25, which is driven by ring gear 18, a sun gear 26, a plurality of planetary gears 27 constantly in mesh with the annulus and sun gears, and a planet carrier 28 which is secured to and delivers power at various values to differential pinion carrier 21. As is common in such a planetary gearset means, as will be hereinbelow described, are available for locking two of the planetary gear members together for direct drive and for locking one member about which a second may react to provide reduced speed and increased power or torque.

Planetary gears 27 are respectively mounted on shafts indicated generally at 30 and each of which shafts extend axially beyond said gears. The inner extension 31 of shaft 30 is secured to differential pinion carrier 21 and, as already noted, transmits drive thereto. Fixedly mounted on an outer extension 32 of each shaft is an internally toothed high speed clutch plate 33. Sun gear 26 is integrally formed on the inner end of a sleeve 34 freely mounted upon axle shaft 19. The sun gear is of sufficient width as to enable it to be moved outwardly on axle 19 so as to enable the teeth of high speed clutch plate 33 while remaining in mesh with planet gears 27. In this outward position the sun and planet gears are locked together thus locking up the gearset and providing direct drive therethrough.

To enable the planetary carrier and thence the rear wheels to be driven at a reduced speed, providing greater power, a mechanism is provided to lock the sun gear 26 against rotation, thus causing planet gears 27 to planetate thereabout and drive planet carrier 28 at a reduced speed. Integrally formed on the outer end of sleeve 34 is a gear 35 which could be, but is not in this instance, an extension of sun gear 26. Gear 35 is adapted to slidably engage with an element connected in an appropriate manner to the differential housing 12 so as to stop the rotation of sleeve 34 and thus also sun gear 26. In this manner planetary gearset 24 may be grounded to housing 12.

To insure that at no time is the sun gear 26 engaged with high speed clutch plate 33 while gear 35 is grounded to the differential carrier, the gears are so spaced that when sleeve 34 is moved outwardly to engage sun gear 26 with clutch plate 33 for high speed drive that gear 35 is not grounded to differential housing 12. As a corollary, when sleeve 34 is moved inwardly to the low speed position grounding gear 35, sun gear 26 moves out of engagement with clutch plate 33.

Sleeve 34 extends beyond gear 35 as at 36 to accommodate a shift fork 40 mounted on a shaft 41. The shift fork is remotely controlled by the operator so as to enable the latter to shift the differential to a high or low speed condition as required. The differential housing is formed to provide an enclosure 42 for the shift fork access to which may be had through a cover 43.

The double planetary-differential gear arrangement including ring gear 18 is supported within the differential housing 12 on bearing devices indicated generally at 50, only one of which is shown. The bearing includes inner and outer races 51 and 52 between which are disposed roller bearings 53. Upon assembling the differential and occasionally thereafter it is necessary to adjust bearing alignment. In order to provide axial adjustment for outer bearing 52, housing opening 13 is internally threaded to receive a bearing adjusting ring 60. With a suitable tool, adjusting ring 60 may be rotated and thus moved axially to maintain the rollers and races in proper adjustment. The right hand bearing device, which as noted is not shown, is substantially identical with the bearing depicted and a bearing adjusting ring similar to 60 is likewise provided to facilitate proper bearing alignment.

Heretofore it had been the practice to have gear teeth formed internally of adjusting ring 60 so that the gear 35 could mesh therewith to ground sleeve 34 against rotation. As a consequence of such an arrangement, however, the reaction forces of the planetary set 24 were taken on the differential carrier but through the bearing adjusting member with result that such member was worked out of adjustment by the intermittent application and release of reaction torque.

One of the improvements in my invention relates to a structure for grounding sun gear 26 to housing 12 by a member other than bearing adjusting ring 60.

In order to necessitate the minimum structural change in multi-speed rear axles as used currently, I have provided a simple mechanism for transferring reaction torque from the planetary gearset 24 to differential housing 12 without imposing any reaction forces on bearing adjusting ring 60. My mechanism includes a reaction plate or cover 70 adapted to be secured to differential housing 12 by studs 71. Inasmuch as the reaction forces transmitted by plate 70 are likely to be high and to preclude the necessity for unusually large studs to withstand such forces, a pair of pedestals or lugs 72 are formed on housing 12 and project laterally therefrom. The perimeter of plate 70 is recessed at 73 to receive lugs 72 which in conjunction with studs 71 restrain said plate against rotation. Consequently the reaction forces imposed upon plate 70 in either direction will be transferred to the differential carrier by the lugs and studs.

A portion of plate 70 is offset to provide a circular opening having a collar 74 thereabout. Collar 74 projects within the carrier opening 13 intermediate adjusting ring 60 and sleeve gear 35. Teeth 75 adapted to be engaged by gear 35 of sleeve 34 are formed radially inwardly of collar 74. Thus when sleeve 34 is shifted axially to its low speed position gear 35 enmeshes with teeth 75 of plate 74 grounding sun gear 26 to the differential carrier.

A further improvement in my invention resides in a device for locking the bearing adjusting ring 60 in position once bearing alignment is set. As already noted, adjusting ring 60 is moved axially to vary bearing alignment. It has been found desirable in such mechanisms to provide means for locking such ring after adjustment to prevent subsequent misalignment. In my invention I combine such a locking device with my reaction plate.

To enable the reaction plate 70 to retain adjusting ring 60 against misalignment, I have provided elements on the plate and ring which engage with each other when the plate is assembled to the differential housing 12. To achieve this desirable result, reaction plate collar 74 has teeth 76 milled or otherwise formed in the outer periphery thereof. The teeth 76 are parallel to the axis of axle 19. Similarly, teeth 77 adapted to engage with teeth 76 are formed radially internally of adjusting ring 60. Therefore, after having rotated ring 60 to adjust bearing alignment, reaction plate 70 is assembled to differential housing 12 and thereby enmeshing the teeth 76 on collar 74 with teeth 77 of ring 60 locking the adjusting ring against further movement.

Thus I have provided a simple plate member 70 removably mounted on housing 12 and which member includes external and internal locking means 76 and 75 for respectively facilitating the maintenance of differential bearing alignment and transmitting reaction torque to the differential carrier.

While I have disclosed specific structures in order to illustrate and describe my invention, it is to be understood that minor structural variations may be made within the scope of my teachings.

I claim:

1. In a torque transfer device having a casing and a bearing for supporting torque transfer mechanism within the casing and having a torque reaction member, a set of teeth on said torque reaction member, an adjustable element for positioning said bearing in said casing, a set of teeth on said adjustable element, a plate member detachably secured to said casing for transferring torque from said reaction element to said casing, a set of teeth on said plate member adapted to engage the teeth of said reaction element, and an additional set of teeth on said plate member in engagement with the teeth of said adjustable element for preventing movement of said adjustable element with respect to said casing.

2. In a transmission having torque transfer mechanism provided with a movable element adapted to select a plurality of drive ratios, a casing, a bearing for supporting said torque transfer mechanism in said casing and adjusting means for adjusting the position of said bearing, the improvement comprising a plate member detachably secured to said casing and separate from said bearing adjusting means, means carried by said plate member for preventing rotation of said movable element when said element is positioned to select a predetermined drive ratio, and means carried by said plate member for preventing movement of said bearing adjusting means.

3. In a transmission having torque transfer mechanism provided with a movable element adapted to select a plurality of drive ratios and having a set of teeth thereon, a casing, a bearing for supporting said torque transfer mechanism in said casing and adjusting means for adjusting the position of said bearing, the improvement comprising a plate member detachably secured to said casing, a set of teeth on said plate member adapted to engage the teeth of said movable element in one position thereof, and a second set of teeth on said plate member adapted to engage said bearing adjusting means for preventing movement of said bearing adjusting means with respect to said casing.

4. In a torque transfer device having a torque reaction member, a casing, a cylindrical opening in said casing, a bearing for supporting torque transfer mechanism within said casing, said bearing being positioned in said casing opening and supported by said casing, said casing opening having a threaded portion thereon, a bearing adjusting ring positioned in said casing opening, threads on said adjusting ring cooperating with said threads on said casing opening, an opening in said bearing adjusting ring, splines on said adjusting ring opening, a plate member having a portion thereof extending into said adjusting ring opening, splines carried by said plate member for engaging the splines on said adjusting ring, additional splines on said plate member, splines on said torque reaction member, said additional splines on said plate member being adapted to engage said splines on said torque reaction member when said plate member is assembled on said casing, and means detachably securing said plate member to said casing.

5. In a torque transfer device having a casing and having torque transfer mechanism and a torque reaction member within said casing, an opening in said casing, a bearing for supporting said torque transfer mechanism positioned in said opening and slidably supported upon said casing, a bearing adjusting ring in said opening in contact with said bearing and threadably mounted on said casing, an opening in said bearing adjusting ring, splines on said adjusting ring adjacent said ring opening, a plate member detachably secured to said casing having an extension protruding into said adjusting ring opening, splines on said plate extension cooperating with the splines on said adjusting ring for preventing rotation of said adjusting ring, splines on said torque reaction member, and additional splines on said plate extension adapted to engage the splines of said torque reaction member to prevent rotation of said reaction member in said casing.

6. In a torque transfer device, a casing, a cylindrical opening in said casing, a bearing for supporting torque transfer mechanism within said casing, said bearing being positioned in said casing opening and supported by said casing, said casing opening having internal threads on a portion thereof, a bearing adjusting ring positioned in said casing opening in contact with said bearing, said adjusting ring having external threads in engagement with said first-mentioned internal threads, an opening through said adjusting ring, a series of splines on said adjusting ring at said adjusting ring opening, a plate member overlying said casing opening, said plate member having an extension thereof extending into said adjusting ring opening, a series of splines on said plate member extension for engaging the splines on said bearing adjusting ring, an opening through said plate member and said plate member extension, a series of splines on said plate member extension adjacent said extension opening, a torque reaction member extending through said plate member opening, a series of splines on said torque reaction member adapted to engage said splines on said plate member extension, and means detachably securing said plate member to said casing.

7. In a torque transfer device, a casing, a cylindrical opening in said casing, a bearing for supporting torque transfer mechanism within said casing, said bearing being positioned in said casing opening in sliding contact with said casing and supported by said casing, internal threads on a portion of said opening, a bearing adjusting ring positioned in said casing opening in contact with said bearing, said adjusting ring having external threads in engagement with said first-mentioned internal threads, an opening through said adjusting ring, a series of splines on said adjusting ring at said adjusting ring opening, a plate member having a portion thereof overlying said casing opening, a recess on said plate member, a lug on said casing extending into said recess for preventing rotation of said plate member with respect to said casing, an extension on said plate member extending into said adjusting ring opening, a series of splines on said plate member extension adapted to engage the splines of said bearing adjusting ring for preventing rotation of said bearing adjusting ring, an opening through said plate member and said plate member extension, a series of splines on said plate member extension adjacent said last-mentioned opening, a torque reaction member extending through said last-mentioned opening, a series of splines on said torque reaction member adapted to engage said splines on said plate extension, and means detachably securing said plate member to said casing.

References Cited in the file of this patent
UNITED STATES PATENTS

| | | |
|---|---|---|
| 1,231,320 | Alden | June 26, 1917 |
| 1,362,361 | Starr | Dec. 14, 1920 |
| 1,614,992 | Roberts | Jan. 18, 1927 |
| 1,631,557 | Sponable | June 7, 1927 |
| 1,965,266 | Starr | July 3, 1934 |
| 2,147,145 | Carlson et al. | Feb. 14, 1939 |
| 2,178,900 | Starr | Nov. 7, 1939 |
| 2,326,754 | Buckendale | Aug. 17, 1943 |
| 2,386,946 | Greiner et al. | Oct. 16, 1945 |
| 2,414,388 | Orr et al. | Jan. 14, 1947 |
| 2,438,620 | Russell | Mar. 30, 1948 |